United States Patent [19]

Cook et al.

[11] Patent Number: 5,139,986
[45] Date of Patent: Aug. 18, 1992

[54] CATALYST COMPOSITION FOR PRODUCTION OF LINEAR LOW-DENSITY ETHYLENE-HEXENE COPOLYMERS AND FILMS THEREOF

[75] Inventors: Pam J. Cook, Houston, Tex.; Robert O. Hagerty, Metuchen, N.J.; Per K. Husby; Thomas E. Nowlin, both of Somerset, N.J.

[73] Assignee: Mobil Oil Corporation, Fairfax, Va.

[21] Appl. No.: 740,781

[22] Filed: Aug. 6, 1991

[51] Int. Cl.$^5$ ................................................ C08F 4/64
[52] U.S. Cl. ..................................... 502/112; 502/103; 502/110; 502/125; 502/126; 502/127; 502/134
[58] Field of Search ............... 502/103, 110, 112, 125, 502/126, 127, 134

[56] References Cited

U.S. PATENT DOCUMENTS

| | | | |
|---|---|---|---|
| 4,302,566 | 11/1981 | Karol et al. | 526/125 |
| 4,634,687 | 1/1987 | Fujita et al. | 502/122 |
| 5,037,908 | 8/1991 | Tachikawa et al. | 502/120 |
| 5,055,533 | 10/1991 | Allen et al. | 526/125 |

*Primary Examiner*—Patrick P. Garvin
*Assistant Examiner*—Brent M. Peebles
*Attorney, Agent, or Firm*—Alexander J. McKillop; Charles J. Speciale; Marina V. Schneller

[57] ABSTRACT

The invention relates to catalysts for ethylene polymerization or copolymerization to produce film quality product which exhibits improved FDA hexane extractables. The invention also relates to catalysts for ethylene polymerization or copolymerization to produce film quality product which exhibits improved dart impact resistance. The invention relates to catalysts for ethylene polymerization or copolymerization to produce film quality product which exhibits improved MD tear properties.

18 Claims, No Drawings

CATALYST COMPOSITION FOR PRODUCTION OF LINEAR LOW-DENSITY ETHYLENE-HEXENE COPOLYMERS AND FILMS THEREOF

FIELD OF THE INVENTION

The present invention relates to a catalyst for polymerizing olefins, to a method for producing such a catalyst, to a method of polymerizing olefins with such a catalyst, and to films production therewith. A particular aspect of the present invention relates to a catalyst composition which produces linear low density polyethylene (LLDPE) of film production quality, of relatively improved polymer bulk density and narrow molecular weight distribution, and to the polymerization process utilizing such a catalyst composition and to film production therewith whereby the films are characterized by improved dart impact resistance, resin film strength, and reduced FDA extractables.

BACKGROUND OF THE INVENTION

Ziegler et al, in U.S. Pat. 4,063,009, describe various polymerization processes suitable for producing forms of polyethylene. Ziegler et al, in U.S. Pat. 4,063,009, describe a catalyst therefor which is the reaction product of an organomagnesium compound (e.g., an alkylmagnesium halide) with a tetravalent titanium compound. The reaction of the organomagnesium compound with the tetravalent titanium compound takes place in the absence of a support material.

Linear low density polyethylene polymers possess properties which distinguish them from other polyethylene polymers, such as ethylene homopolymers. Some properties of linear low density polyethylene polymers are described by Anderson et al, U.S. Pat. No. 4,076,698. Karol et al, U.S. Pat. No. 4,302,566, describe a process for producing certain linear low density polyethylene polymers in a gas phase, fluid bed reactor.

Nowlin et al, U.S. Pat. No. 4,481,301, the entire contents of are incorporated herein by reference, disclose a supported alpha-olefin polymerization catalyst composition prepared by reacting a support containing OH groups with a stoichiometric excess of an organomagnesium composition, with respect to the OH groups content, and then reacting the product with a tetravalent titanium compound. The preferred activator of Nowlin et al is triethylaluminum.

It is a primary object of the present invention to prepare a catalyst composition for the polymerization of alpha-olefins which yields polymerization products having a relatively narrow molecular weight distribution and high bulk density and for production therefrom of films with improved tear strength, FDA extractables, and dart impact resistance.

SUMMARY OF THE INVENTION

The catalyst comprises a titanium containing compound, treated with a methyl aluminum compound selected from the group consisting of dimethylaluminum chloride, trimethylaluminum and admixtures thereof and then combined with triethylaluminum or trimethylaluminum. Polymeric product exhibits excellent bulk density products, comparable to commercial standards, and produces, in film fabrication, films of low FDA extractables, high dart impact resistance and high MD tear strengths.

DETAILED DESCRIPTION OF THE INVENTION

The Catalyst

The catalyst compositions employed in the process of the present invention are produced by forming a precursor composition from a magnesium compound, and a compound of a transition metal, preferably titanium, preferably in a solvent which may be an electron donor; partially activating the precursor with DMAC (dimethylaluminum chloride), TMA (trimethylaluminum) or admixtures thereof; optionally diluting said precursor composition with an inert carrier; and activating the diluted precursor composition with at least one organoaluminum compound. In accordance with the invention, the organoaluminum compound is provided as triethylaluminum and/or trimethylaluminum.

Suitable transition metal compounds are compounds of Groups IVA, VA, or VIA, VIIA or VIII of the Periodic Chart of the Elements, published by the Fisher Scientific Company, Catalog No. 5-702-10, 1978, e.g., compounds of titanium (Ti), zirconium (Zr), vanadium (V), tantalum (Ta), chromium (Cr) and molybdenum (Mo), such as $TiCl_4$, $TiCl_3$, $VCl_4$, $VCl_3$, $VOCl_3$, $MoCl_5$, $ZrCl_5$ and chromiumacetylacetonate. Of these compounds, the compounds of titanium and vanadium are preferred, and the compounds of titanium are most preferred.

The structure of titanium compound(s) employed in preparing the precursor composition has a formula

$(OR)_a X_b$ wherein R is an aliphatic or aromatic hydrocarbon radical containing from 1 to 14 carbon atoms, or COR' where R' is an aliphatic or aromatic hydrocarbon radical containing from 1 to 14 carbon atoms, X is selected from the group consisting of Cl, Br, I, and mixtures thereof, a is 0, 1 or 2, b is 1 to 4 inclusive, and $a+b=3$ or 4.

Suitable titanium compounds include $TiCl_3$, $TiCl_4$, $Ti(OCH_3)Cl_3$, $Ti(OC_6H_5)Cl_3$, $Ti(OCOCH_3) Cl_3$ and $Ti(OCOC_6H_5)Cl$hd 3. In some instances, $TiCl_3$ may be preferred because catalysts containing this material show higher activity at the low temperatures and monomer concentrations employed in the process of the present invention.

The formula of magnesium compound(s) employed in preparing the precursor composition is

$MgX_2$ wherein X is selected from the group consisting of cl, Br, I, and mixtures thereof.

Suitable magnesium compounds include $MgCl_2$, $MgBr_2$ and $MgI_2$. Anhydrous $MgCl_2$ is particularly preferred.

The solvent or electron donor compound(s) employed in preparing the precursor composition is an organic compound which is liquid at 25° C. and in which the titanium and magnesium compounds are soluble. The electron donor compounds are known as such, or as Lewis bases.

Suitable solvents or electron donor compounds include the alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbons atoms, preferably from 4 to 5 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds include methyl formate, ethyl acetate, butyl acetate, ethyl ether, tetrahydrofuran, dioxane, acetone and methyl ethyl ketone.

The precursor composition is formed by dissolving at least one transition metal compound, such as a titanium compound and at least one magnesium compound in at least one electron donor compound at a temperature of from about 20° C. up to the boiling point of the electron donor compound. Any one or a combination of any of the well known transition metal compounds can be used in preparing the catalyst precursor of this invention. The titanium compound(s) can be added to the electron donor compound(s) before or after the addition of the magnesium compound(s), or concurrent therewith. The dissolution of the titanium compound(s) and the magnesium compound(s) can be facilitated by stirring, and in some instances by refluxing, these two compounds in the electron donor compound(s). After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 mole to about 10 moles, of the magnesium compound(s) are used per mole of the titanium compound(s) in preparing the precursor composition.

When thus made as disclosed above the blended or impregnated precursor composition has the formula

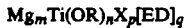

$Mg_mTi(OR)_nX_p[ED]_q$ wherein R is an aliphatic or aromatic hydrocarbon radical containing from 1 to 14 carbon atoms, or COR' wherein R' is also an aliphatic or aromatic hydrocarbon radical containing from 1 to 14 carbon atoms, X is selected from the group consisting of Cl, Br, I, and mixtures thereof, ED is an electron donor compound, m is 0.5 to 56, preferably 1.5 to 5, n is 0, 1 or 2, p is 2 to 116, preferably 6 to 14, and q is 2 to 85, preferably 3 to 10.

After the precursor composition has been prepared it is diluted with an inert carrier material by impregnating such composition into the carrier material.

Impregnation of the inert carrier material with the precursor composition may be accomplished by dissolving the precursor composition in the electron donor compound, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

Suitably, the impregnated carrier material contains from about 3 percent by weight to about 50 percent by weight, preferably from about 10 percent by weight to about 30 percent by weight, of the precursor composition.

The carrier materials employed to dilute the precursor composition are solid, particulate, porous materials which are inert to the other components of the catalyst composition, and to the other active components of the reaction system. These carrier materials include inorganic materials such as oxides of silicon and/or aluminum. The carrier materials are used in the form of dry powders having an average particle size of from about 10 microns to about 250 microns, preferably from about 20 microns to about 150 microns. These materials are also porous and have a surface area of at least 3 square meters per gram, and preferably at least 50 square meters per gram. Catalyst activity or productivity can apparently be improved by employing a silica support having average pore sizes of at least 80 angstrom units, preferably at least 100 Angstrom units. The carrier material should be dry, that is, free of absorbed water. Drying of the carrier material can be effected by heating, e.g., at a temperature of at least 600° C. when silica is employed as the support. Alternatively, when silica is employed, it may be dried at a temperature of at least 200° C. and treated with about 1 weight percent to about 8 weight percent of one or more of the aluminum activator compounds described below. Modification of the support with an aluminum compound in this manner provides the catalyst composition with increased activity and also improves polymer particle morphology of the resulting ethylene copolymers.

In accordance with the invention, the catalyst precursor is partially activated prior to contact with a cocatalyst. That is, the precursor is contacted with at least one compound selected from the group consisting of dimethylaluminum chloride, trimethylaluminum and admixtures thereof. Preferably, this is undertaken after carrier incorporation into the precursor. This partial activation reaction provides an important control of the early stage of reaction to limit the initial rate of reaction of each catalyst particle so as to control its peak temperature. As is known in the prior art, this has the effect of increasing the bulk density of the resulting polymer. It has been discovered that the partial activation treatment of the invention also has a significant effect on the strength of films produced low density polymerization products. The total amount of prereducing reagent system ranges from 0.1 to 0.8 moles of prereducing agent per mole of THF (tetrahydrofuran) in the unprereduced precursor. The reagent can be a system including, in addition to those methylaluminum compounds described above, triethylaluminum, tri-n-hexylaluminum, and diethylaluminum chloride.

The partial activation reaction is preferably carried out in a hydrocarbon solvent slurry followed by drying of the resulting mixture, to remove the solvent, at temperatures of from about 20° C. to about 80° C., preferably from about 50° C. to about 70° C. The resulting product is a free-flowing solid particulate material which can be readily fed to the polymerization reactor where the activation is completed with additional activator compound which can be the same or a different compound as that employed for the partial activation.

The partially activated precursor is then reacted with a cocatalyst or activator which is trimethylaluminum (TMA) or triethylaluminum (TEAL) either outside of the reactor vessel or inside the vessel with the catalyst activator.

The activator is employed in an amount which is at least effective to promote the polymerization activity of the solid component of the catalyst of this invention. If TMA is employed as the activator, it is preferably used in such amounts that the concentration thereof in the polymer product is about 15 to about 300 parts per million (ppm), preferably it is about 30 to about 150 ppm, and most preferably about 60 to about 100 ppm. If TEAL is employed as the activator, it is preferably used in such amounts that the concentrations thereof in the polymer product is about 150 to 500 ppm, and most preferably about 250 to 350 ppm. In slurry polymerization processes, a portion of the activator can be employed to pretreat the polymerization medium if desired.

The catalyst may be activated in situ by adding the activator and catalyst separately to the polymerization medium. It is also possible to combine the catalyst and activator before the introduction thereof into the polymerization medium, e.g., for up to about 2 hours prior to the introduction thereof into the polymerization medium at a temperature of from about −40 to about 100° C.

A suitable activating amount of the activator may be used to promote the polymerization activity of the catalyst. The aforementioned proportions of the activator can also be expressed in terms of the number of moles of activator per gram atom of titanium in the catalyst composition, e.g., from about 6 to about 80, preferably about 8 to about 20 moles of TMA activator per gram atom of titanium.

The olefin polymerization

Higher alpha olefins which can be polymerized with ethylene to produce the low density copolymers of the present invention can contain 3 to 8 carbon atoms. These alpha olefins should not contain any branching on any of their carbon atoms closer than two carbon atoms removed from the double bond. Suitable alpha olefins include propylene, butene-1, pentene-1, hexene-1, 4-methylpentene-1, heptene-1 and octene-1. The preferred alpha olefin is hexene-1. The linear low density polyethylene polymers produced in accordance with the present invention preferably contain at least about 80 percent by weight of ethylene units.

A "diluent" gas is employed with the comonomers. It is nonreactive under the conditions in the polymerization reactor other than to terminate polymer chain growth. In addition, such gas should be isoluble in the polymer product produced so as not to contribute to polymer tackiness. The diluent gas can be hydrogen, nitrogen, argon, helium, methane, ethane, and the like.

When hydrogen is employed as a diluent gas, the diluent serves not only to dilute the reaction mixture and prevent polymer agglomeration, but also acts as a chain transfer agent to regulate the melt index of the copolymers produced by the process. Generally, the reaction mixture contains hydrogen in an amount sufficient to produce a hydrogen to ethylene mole ratio of from 0.01:1 to 1.0:1. The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 70 to about 105° C. The molecular weight control is evidenced by a measurable positive change in melt index ($I_2$) of the polymer when the molar ratio of hydrogen to ethylene in the reactor is increased.

The average molecular weight of the polymer is also dependent on the amount of the TMA activator employed. Increasing the TMA concentration in the reactor gives small, positive changes in melt index. In addition to hydrogen, other chain transfer agents may be employed to regulate the melt index of the copolymers. Catalyst poisons such as moisture, oxygen, carbon monoxide, carbon dioxide, acetylene and the like should be excluded from the gaseous reaction mixture. Lower concentration of the higher alpha olefin comonomer in the reaction mixture vis-a-vis the ethylene concentration, i.e., the higher the density and modulus of the copolymer being produced, the higher the temperature which can be employed.

Exact conditions in the reactor may vary depending on the concentration of diluent gas with higher diluent gas concentrations permitting the use of somewhat higher temperature. Temperatures can generally range from 10° C. to 80° C. The density of the copolymer is directly related to the temperature. Usually temperatures of 10° C. to 60° C. are employed to produce copolymers having a density of from 0.86 $g/cm^3$ to 0.90 $g/cm^3$. More elevated temperatures of from 60° C. up to 80° C. are ordinarily employed in the production of copolymers having a density of from 0.90 $g/cm^3$ up to 0.91 $g/cm^3$.

Pressures can range up to 7000 kPa. However, preferably pressures range from 70 kPa to 2500.

A particularly desirable method for producing linear low density polyethylene polymers according to the present invention is in a fluid bed reactor. Such a reactor and means for operating the same is described by Levine et al, U.S. Pat. No. 4,011,382 and Karol et al, U.S. Pat. No. 4,302,566, the entire contents of both of which are incorporated herein by reference.

In fluidized bed reactors, the superficial gas velocity of the gaseous reaction mixture through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient.

The copolymer products

The copolymer products contain 200 to 800 ppm residue of the activated catalyst described above.

They are low density products characterized by a density ranging from 0.910 to 0.970 $g/cm^3$. The polymers prepared in the presence of the catalyst of this invention are linear low density resins. They exhibit relatively low values of melt flow ratio, evidencing a relatively narrow molecular weight distribution, than similar polymers prepared in the presence of previously-known catalyst compositions. Thus, the polymers prepared with the catalysts of this invention are especially suitable for the production of low density, high strength film resins, and low density injection molding resins.

The molecular weight distribution of the polymers prepared in the presence of the catalysts of the present invention, as expressed by the melt flow ratio (MFR) values, varies from about 24 to about 29, preferably from 26 to 27 for LLDPE products having a density of about 0.914 to about 0.926 gms/cc, and an $I_2$ melt index of about 0.9 to about 4.0. As is known to those skilled in the art, such MFR values are indicative of a relatively narrow molecular weight distribution, thereby rendering the polymers especially suitable for low density film applications since the products exhibit less molecular orientation in high-speed film blowing processes, and therefore have greater film strength.

They are characterized further by a bulk density of about 25 pounds/ft$^3$.

Additionally, the polymer resins produced with the novel catalyst composition of this invention have reduced hexane extractables, and films manufactured from such polymer resins have improved strength properties, as compared to resins and films prepared from resins made with other catalyst compositions. The term "hexane extractables" is used herein to define the amount of a polymer sample extracted by refluxing the sample in hexane in accordance with the FDA-approved procedure. As is known to those skilled in the art, the FDA requires that all polymer products having food contact contain less than 5.5% by weight of such hexane extractables. The polymers produced with the catalyst compositions of the present invention have about 25% lower hexane extractables than the polymers prepared with other catalysts.

When fabricated into films, the films exhibit high dart impact resistance.

Dart impact resistance or dart drop is defined herein by A.S.T.M. D-1709, Method A; with a 38.1 mm dart, and a drop height of 0.66 meters. For example, the films of the present invention exhibit significant improvement in dart drop and machine dimension (MD) tear properties than the films prepared with previously-known catalysts.

The resins prepared with the catalyst of the invention may have higher settled bulk densities than the resins prepared with similar catalysts synthesized with TEAL or other prior art activators, and may have substantially improved higher alpha-olefins, e.g., 1-hexene, incorporation properties, as compared to different catalyst compositions.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column; reported as gms/cc |
| Melt Index (MI), $I_2$ | ASTM D-1238- Condition E - Measured at 190° C. - reported as grams per 10 minutes. |
| High Load Melt Index, $I_{21}$ | ASTM D-1238 - Condition F - Measured at 10.5 (HLMI), $I_{21}$ times the weight used in the melt index test above. |
| Melt Flow Ratio = (MFR) | $\frac{I_{21}}{I_2}$ |
| Productivity | A sample of the resin product is ashed, and the weight % of ash is determined; since the ash is essentially composed of the catalyst, the productivity is thus the pounds of polymer produced per pound of total catalyst consumed. The amount of Ti, Mg and Cl in the ash are determined by elemental analysis. |
| Settled Bulk Density | The resin is poured via 1" diameter funnel into a 100 mil graduated cylinder to 100 mil line without shaking the cylinder, and weighed by difference. The cylinder is then vibrated for 5-10 minutes until the resin level drops to a final, steady-state level. The settled bulk density is taken as the indicated cylinder volume at the settled level, divided by the measured resin weight. |
| n-hexane extractables | (FDA test used for polyethylene film intended for food contact applications). A 200 square inch sample of 1.5 mil gauge film is cut into strips measuring 1" × 6" and weighed to the nearest 0.1 mg. The strips are placed in a vessel and extracted with 300 ml of n-hexane at 50 ± 1° C. for 2 hours. The extact is then decanted into tared culture dishes. After drying the extract in a vacuum dessicator the culture dish is weighed to the nearest 0.1 mg. The extractables, normalized with respect to the original sample weight, is then reported as the weight fraction of n-hexane extractables. |
| Machine Direction Tear, MD$_{TEAR}$ (gm/mil) | ASTM D-1922 |

EXAMPLES

Precursors loaded with Magnesium (MgCl$_2$) and Titanium (TiCl$_3$) were tested. The Mg/Ti ratio ranged from about 3.2 to about 5. These were formed in accordance with the description of Levine et al, U.S. Pat. No. 4,719,193, which is relied upon and incorporated by reference herein.

Table I lists the catalyst compositions and the pilot plant fluid bed results. Catalysts 1 through 5 were prepared from the same batch of precursor, and partially activated with different combinations of aluminum alkyls and alkylaluminum chlorides. The combinations were 1) diethylaluminum chloride (DEAC) and tri-n-hexylaluminum (TnHAL), which is the commercial standard, 2) DEAC and triethylaluminum (TEAL), 3) DEAC and trimethylaluminum (TMA), 4) dimethylaluminum chloride (DMAC) and TnHAL, and 5) DMAC and TMA.

These five catalysts each contained approximately the same molar amounts of the two activating alkyls. Table I identifies the reagent loadings expressed as a molar ratio of added alkyl to the THF (tetrahydrofuran) in the un-prereduced precursor. Catalyst Number 1, the commercial standard, had a somewhat lower loading of DEAC than planned, 0.33 moles/mole compared with the average 0.45.

TABLE I
EXPERIMENTAL CONDITIONS AND RESULTS

| | Catalyst | | | | |
|---|---|---|---|---|---|
| | 1 | 2 | 3 | 4 | 5 |
| Reducing Agents | | | | | |
| Alkyl #1 | DEAC | DEAC | DMAC | DMAC | DEAC |
| Alkyl #2 | TnHAL | TEAL | TnHAL | TMA | TMA |
| Catalyst Compositions | | | | | |
| Mg (wt %) | 2.10 | 2.39 | 2.04 | 2.46 | 2.46 |
| Ti (wt %) | 1.27 | 1.47 | 1.30 | 1.50 | 1.50 |
| Al (wt %) | 4.78 | 5.49 | 4.82 | 5.77 | 6.32 |
| Cl (wt %) | 9.56 | 10.1 | 10.0 | 10.3 | 9.57 |
| THA (wt %) | 10 | 11 | 12 | 12 | 11 |
| Alkyl #1 (mol/mol THF) | 0.33 | 0.48 | 0.44 | 0.46 | 0.46 |
| Alkyl #2 (mol/mol THF) | 0.24 | 0.24 | 0.22 | 0.23 | 0.22 |
| Operating Conditions | | | | | |
| $C_2$ PSI | 93 | 91 | 96 | 103 | 100 |
| $C_6/C_2$ mol ratio | 0.151 | 0.153 | 0.149 | 0.151 | 0.150 |
| $H_2/C_2$ mol ratio | 0.164 | 0.149 | 0.145 | 0.152 | 0.165 |
| Residence Time (h) | 3.7 | 3.6 | 3.6 | 3.8 | 3.6 |
| Cocatalyst (TMA) feed (gms/$10^6$ gm. product) | 91 | 96 | 88 | 87 | 83 |
| Properties | | | | | |
| Melt Index (dg/min) | 0.96 | 1.17 | 1.0 | 1.0 | 0.94 |
| Melt Flow Ratio | 27.2 | 27.4 | 27.6 | 26.2 | 26.6 |
| Density (g/cc) | 0.9170 | 0.9173 | 0.9168 | 0.9180 | 0.9190 |
| Settled Bulk Den (lb/ft$^3$) | 24.9 | 25.2 | 25.5 | 25.0 | 25.2 |
| Ti (ppm) | 3.4 | 2.4 | 2.4 | 3.3 | 2.2 |
| Film Properties | | | | | |
| FDA Extractables (wt %) | 3.8 | 4.3 | 4.0 | 3.0 | 3.0 |
| Dart Impact (g) | 340 | 310 | 340 | 330 | 350 |
| MD Tear (gm/mil) | 420 | 460 | 450 | 480 | 460 |

The catalysts were tested in the pilot plant fluid bed reactor under substantially equivalent conditions (Table I). The catalyst activator used in all experiments was TMA. The feed rate of TMA was 80 to 100 (83-96) ppm based on the resin production rate. Other reaction conditions were: 88° C. reaction temperature, 111 pound bed weight, 31 lb/hour ethylene feed. The $H_2/C_2$ molar ratio was adjusted to between 0.14 and 0.17, and hexene feed between 5.6 and 5.9 lb/hour to maintain product specifications. The target was a 0.9170 to 0.9190 ASTM density, 0.9 to 1.1 melt index resin. Consequently, pilot plant QC densities ranged between 0.915 and 0.917, and flow indices between 22 and 29.

Resin samples from the pilot plant were fabricated into film, and the physical properties were measured by standard ASTM methods. Results are shown at the bottom of Table I. These data were then corrected to account for small experimental differences in resin density and melt index and presented in Table II. As is known to persons skilled in the art, the properties of polyethylene film are sensitive to variations in resin density and melt index. The corrections were done to remove these effects from the data of Examples 1 through 5, so as to isolate the effects of the catalyst changes. The corrections were carried by the generally recognized methods described by Schurzky, Journal of Plastic Film & Sheeting, Vol. 1, pp 142-151, Apr. 1985, the entire contents of which are incorporated herein by reference.

Results indicate that if the reactor products had exactly the same density and melt index then:

Replacing DEAC with DMAC lowers extractables 7% and raises dart impact resistance and MD tear strength 10% (catalysts 1 vs 2).

2. Replacing TnHAL with TMA raises dart impact 5% and MD tear 8% (catalysts 1 vs 4).

3. Replacing both DEAC and TnHAL with DMAC and TMA lowers FDA extractables 13% and raises dart impact and MD tear 15% (catalysts 1 vs 3).

4. Polymer bulk density was not affected by the change in alkyls (Table I).

For film evaluation, each sample was compounded on a 25 pound Banbury, at mild conditions, with 600 ppm Irganox 1076, 1000 ppm PEPQ, and 500 ppm, each, zinc stearate and AS990. Film was then fabricated on the 2½inch Sterling extruder at 1.5 mil film guage, 430° F. melt temperature, 100 mil die gap, 2:1 BUR, and 6 pounds/hour inch of die.

TABLE II
COMPARATIVE PRODUCT PROPERTIES
(Corrected for Density and MI Variations)

| | Activating Agent Alkyl Groups | | (a) FDA Extractables (wt %) | (b) Relative Dart Impact | (c) Relative MD Tear |
|---|---|---|---|---|---|
| | Alkyl #1 | Alkyl #2 | | | |
| 1 | DEAC | TnHAL | 3.0 | 1.00 | 1.00 |
| 2 | DMAC | TnHAL | 2.8 | 1.10 | 1.11 |
| 3 | DMAC | TMA | 2.6 | 1.15 | 1.15 |
| 4 | DEAC | TMA | 3.0 | 1.05 | 1.08 |
| 5 | DEAC | TEAL | 3.2 | 1.04 | 1.10 |

(a) Normalized to 0.9190 g/cc resin density, 27 dg/min resin $I_{21}$
(b) Relative to Catalyst 1, the commercial standard Thus it is apparent that there has been provided, in accordance with the invention, an olefin polymerization catalyst, olefin polymers and olefin films, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for polymerizing ethylene alone or in admixture with alpha olefin containing at least three carbon atoms to produce homopolymers of ethylene or copolymers of ethylene containing at least about 80% by weight ethylene units of film quality product, wherein the catalyst composition is formed by a method consisting essentially of the following steps:
   (i) providing a titanium containing compound 2. The catalyst composition of claim 1, wherein said reagent system further includes tri-n-hexylaluminum.

3. The catalyst composition of claim 1, wherein said reagent system comprises dimethyl aluminum chloride.

4. The catalyst composition of claim 2 wherein said reagent system comprises dimethyl aluminum chloride 5. The catalyst composition of claim 3 wherein said reagent system further comprises diethylaluminum chloride.

6. The catalyst composition of claim 1 wherein said reagent system consists of dimethylaluminum chloride and trimethylaluminum.

7. The catalyst composition of claim 1, wherein said titanium compound is produced by reacting $Ti(OR)_aX_b$ with $MgX_2$
   wherein R is an aliphatic or aromatic hydrocarbon radical containing from 1 to 14 carbon atoms, or COR' where R' is an aliphatic or aromatic hydrocarbon radical containing from 1 to 14 carbon atoms,
   x is selected from the group consisting of Cl, Br, I, and mixtures thereof,
   a is 0, 1 or 2, b is 1 to 4 inclusive, and a+b=3 or 4.

8. The catalyst composition of claim 2 wherein said titanium compound is produced by reacting $Ti(OR)_aX_B$ with $MgX_2$
   wherein R is an aliphatic or aromatic hydrocarbon radical containing from 1 to 14 carbon atoms, or COR' where R' is an aliphatic or aromatic hydrocarbon radical containing from 1 to 14 carbon atoms,
   X is selected from the group consisting of Cl, Br, I, and mixtures thereof,
   a is 0, 1 or 2, b is 1 to 4 inclusive, and a+b=3 or 4.

9. The catalyst composition of claim 5 wherein said titanium compound is produced by reacting $Ti(OR)_aX_b$ with $MgX_2$
   wherein R is an aliphatic or aromatic hydrocarbon radical containing from 1 to 14 carbon atoms, or COR' where R' is an aliphatic or aromatic hydrocarbon radical containing from 1 to 14 carbon atoms,
   X is selected from the group consisting of Cl, Br, I, and mixtures thereof,
   a is 0, 1 or 2, b is 1 to 4 inclusive, and a+b=3 or 4.

10. The catalyst of claim 1, wherein ED is tetrahydrofuran.

11. The catalyst of claim 2, wherein ED is tetrahydrofuran.

12. The catalyst of claim 3, wherein ED is tetrahydrofuran.

13. The catalyst of claim 4, wherein ED is tetrahydrofuran.

14. The catalyst of claim 5, wherein ED is tetrahydrofuran.

15. The catalyst of claim 6, wherein ED is tetrahydrofuran.

16. The catalyst of claim 7, wherein ED is tetrahydrofuran.

17. The catalyst of claim 8, wherein ED is tetrahydrofuran.

18. The catalyst of claim 9, wherein ED is tetrahydrofuran.

* * * * *

UNITED STATES PATENT AND TRADEMARK OFFICE
CERTIFICATE OF CORRECTION

PATENT NO. : 5,139,986

DATED : August 18, 1992

INVENTOR(S) : Pam J. Cook et al

It is certified that error appears in the above-identified patent and that said Letters Patent is hereby corrected as shown below:

Column 11, Line 11, (Claim 1), after "compound" insert:
--which has the empirical formula
$$Mg_mTi(OR)_nX_p[ED]_q$$
wherein R is an aliphatic or aromatic hydrocarbon radical containing from 1 to 14 carbon atoms, or COR' wherein R' is also an aliphatic or aromatic hydrocarbon radical containing from 1 to 14 carbon atoms,
wherein X is selected from the group consisting of Cl, Br, I, and mixtures thereof,
ED is an electron donor compound,
m is 0.5 to 56, preferably 1.5 to 5,
n is 0, 1 or 2,
p is 2 to 116, preferably 6 to 14, and
q is 2 to 85, preferably 3 to 10.

UNITED STATES PATENT AND TRADEMARK OFFICE
CERTIFICATE OF CORRECTION

PATENT NO. : 5,139,986

DATED : August 18, 1992

INVENTOR(S) : Pam J. Cook, et al

It is certified that error appears in the above-identified patent and that said Letters Patent is hereby corrected as shown below:

(ii) reacting the titanium containing compound with a reagent system which comprises a methyl aluminum compound selected from the group consisting of dimethyl aluminum chloride or trimethyl aluminum or admixtures thereof,
        wherein the reagent system is reacted with the titanium containing compound at a temperature of about 50° to about 70°C to produce a product of step (ii) and wherein the amount of said methyl aluminum compound in the reagent system provides 0.1 to 0.8 moles of aluminum compound per mole of ED; and then
    (iii) forming the catalyst by combining the product of (ii) with an activating amount of trimethyl aluminum or triethyl aluminum so that the amount of the trimethyl aluminum or triethyl aluminum is from 6 to about 80 moles per gram atom of titanium.--

Column 11, line 37, (Claim 7) "$_aX_B$" should read --$_aX_b$--

Signed and Sealed this

First Day of June, 1993

MICHAEL K. KIRK

Attesting Officer     Acting Commissioner of Patents and Trademarks